United States Patent [19]
Wen et al.

[11] Patent Number: 5,975,680
[45] Date of Patent: Nov. 2, 1999

[54] PRODUCING A NON-EMISSIVE DISPLAY HAVING A PLURALITY OF PIXELS

[75] Inventors: Xen Wen, Rochester; Daniel J. Harrison, Pittsford, both of N.Y.

[73] Assignee: Eastman Kodak Company, Rochester, N.Y.

[21] Appl. No.: 09/019,064

[22] Filed: Feb. 5, 1998

[51] Int. Cl.[6] .................................. B41J 2/21; B41J 2/01; G09G 3/34

[52] U.S. Cl. ........................... 347/43; 347/103; 345/107

[58] Field of Search .................................. 347/14, 16, 19, 347/43, 101, 105, 103, 106, 100; 264/4, 4.1; 345/84, 85, 107; 359/296

[56] References Cited

U.S. PATENT DOCUMENTS

| | | | |
|---|---|---|---|
| 3,612,758 | 10/1971 | Evans et al. | 348/803 |
| 4,143,103 | 3/1979 | Sheridon | 264/4 |
| 5,344,594 | 9/1994 | Sheridon | 264/4.1 |
| 5,389,945 | 2/1995 | Sheridon | 345/85 |
| 5,598,196 | 1/1997 | Braun | 347/68 |
| 5,604,027 | 2/1997 | Sheridon | 428/323 |
| 5,866,284 | 2/1999 | Vincent | 430/37 |

FOREIGN PATENT DOCUMENTS

WO 97/04398  2/1997  WIPO .

OTHER PUBLICATIONS

"A Newly Developed Electrical Twisting Ball Display" by Saitoh et al p249–253, Proceedings of the SID, vol. 23/4, 1982.

*Primary Examiner*—N Le
*Assistant Examiner*—Thinh Nguyen
*Attorney, Agent, or Firm*—Raymond L. Owens

[57] ABSTRACT

An ink jet printing apparatus for producing a non-emissive display having a plurality of pixels on a substrate and the pixels being defined by intersecting electrodes includes a plurality of reservoirs containing fluids including solid-phase field-driven particles; a print head located in a printing position having at least one nozzle connected to a reservoir; and producing a signal associated with the position of the substrate relative to the print head. The substrate is moved in a first direction to the printing position in response to the signal. The signal causes the print head to eject drops of the fluids from the nozzles at the intersecting electrodes on the substrate and for providing relative movement in a second direction between the print head and the substrate for fluids to be transferred to subsequent intersecting electrodes. The field-driven solid-phase particles in the fluid transferred to the substrate change optical density in response to an applied electric voltage between the associated intersecting electrodes to produce the desired optical density in the non-emissive display.

13 Claims, 4 Drawing Sheets

PRODUCING A NON-EMISSIVE DISPLAY HAVING A PLURALITY OF PIXELS

CROSS REFERENCE TO RELATED APPLICATIONS

Reference is made to commonly assigned U.S. patent application Ser. No. 08/934,371 filed Sep. 19, 1997, entitled "A Portable Electronic Recording and Displaying Device"; U.S. patent application Ser. No., 09/012,890 filed Jan. 23, 1998, entitled "Camera with Electronic Display"; U.S. patent application Ser. No. 08/951,017 filed Oct. 15, 1997, entitled "Camera with Microfluidic Printer"; and U.S. patent application Ser. No. 09/012,842 filed Jan. 23, 1998, entitled "Addressing Non-emissive Color Display Device". The disclosure of these related applications is incorporated herein by reference.

FIELD OF THE INVENTION

The present invention relates to the field of non-emissive color display devices. This invention is related to a non-emissive color display apparatus that change optical densities using field-driven solid phase particles.

BACKGROUND OF THE INVENTION

A non-emissive display produces information by varying the optical density on a display surface. One type of non-emissive displays is based on field-driven solid-phase particles. One class in such displays is the so-called electrophoretic display that is based on the principle of movement of charged particles in an electric field. In an electrophoretic display, the charged particles containing different reflective optical densities can be moved by an electric field to or away from the viewing side of the display, which produces a contrast in the optical density. Another class of the field-driven particles used in non-emissive displays includes the particles carrying an electric dipole. Each pole of the particle is associated with a different optical density (bi-chromatic). The electric dipole can be aligned by a pair of electrodes in two directions, which orient each of the two polar surfaces to the viewing direction. The different optical densities on the two halves of the particles thus produce a contrast in the optical densities.

The field-driven particles can be immersed in a fluid, which are together contained in a microencapsule. At each pixel of the display, an electric field can be applied to the solid-phase field-driven particles within the microencapsules by a pair of electrodes. The two electrodes can be spaced apart in a parallel fashion with the microencapsules sandwiched in between. In this case, the electrode on the viewing side is required to be transparent. The electrodes can also be both fabricated on the non-viewing side of the microencapsules.

One requirement for all displays using field-driven particles is to accurately place the field-driven particles and the associated microencapsules in registration to the electrodes. Furthermore, for color displays using the field-driven particles, it is essential to register the field-driven particles capable of displaying a specific color density and the associated microencapsules to the electrodes corresponding to the colors. Failure to do so will cause the display of incorrect color pixels.

SUMMARY OF THE INVENTION

It is an object of the present invention to provide accurate placement of display pixel element relative to the corresponding pixel locations in a non-emissive display.

It is another object of the present invention to provide accurate placement of colored display pixel element corresponding to the correct colors and corresponding pixel locations in a non-emissive display.

These objects are achieved by an ink jet printing apparatus for producing a non-emissive display having a plurality of pixels on a substrate and the pixels being defined by intersecting electrodes, comprising:

a) a plurality of reservoirs containing fluids including solid-phase field-driven particles;

b) a print head located in a printing position having at least one nozzle connected to a reservoir;

c) means responsive to the positions of intersecting electrodes and for producing a signal associated with the position of the substrate relative to the print head;

d) means for moving the substrate in a first direction to the printing position in response to the signal;

e) means responsive to the signal for causing the print head to eject drops of the fluids from the nozzles at the intersecting electrodes on the substrate and for providing relative movement in a second direction between the print head and the substrate for fluids to be transferred to subsequent intersecting electrodes; and f) the field-driven solid-phase particles in the fluid transferred to the substrate being adapted to change optical density in response to an applied electric voltage between the associated intersecting electrodes to produce the desired optical density in the non-emissive display.

Advantages

One advantage of the present invention is that the display pixel element such as the field-driven particles and the associated microencapsules are accurately transferred to pixel locations using an ink jet print head.

Another advantage of the present invention is that a plurality of ink jet print heads can be used to transfer the differently colored display pixel elements to the correct color pixel locations.

A further advantage of the present invention is that the transferring technique for the display pixel element is compatible with all pixel and color pixel patterns.

DETAILED DESCRIPTION OF THE INVENTION

The present invention is described in relation to the formation of a non-emissive image display.

Figure 1:
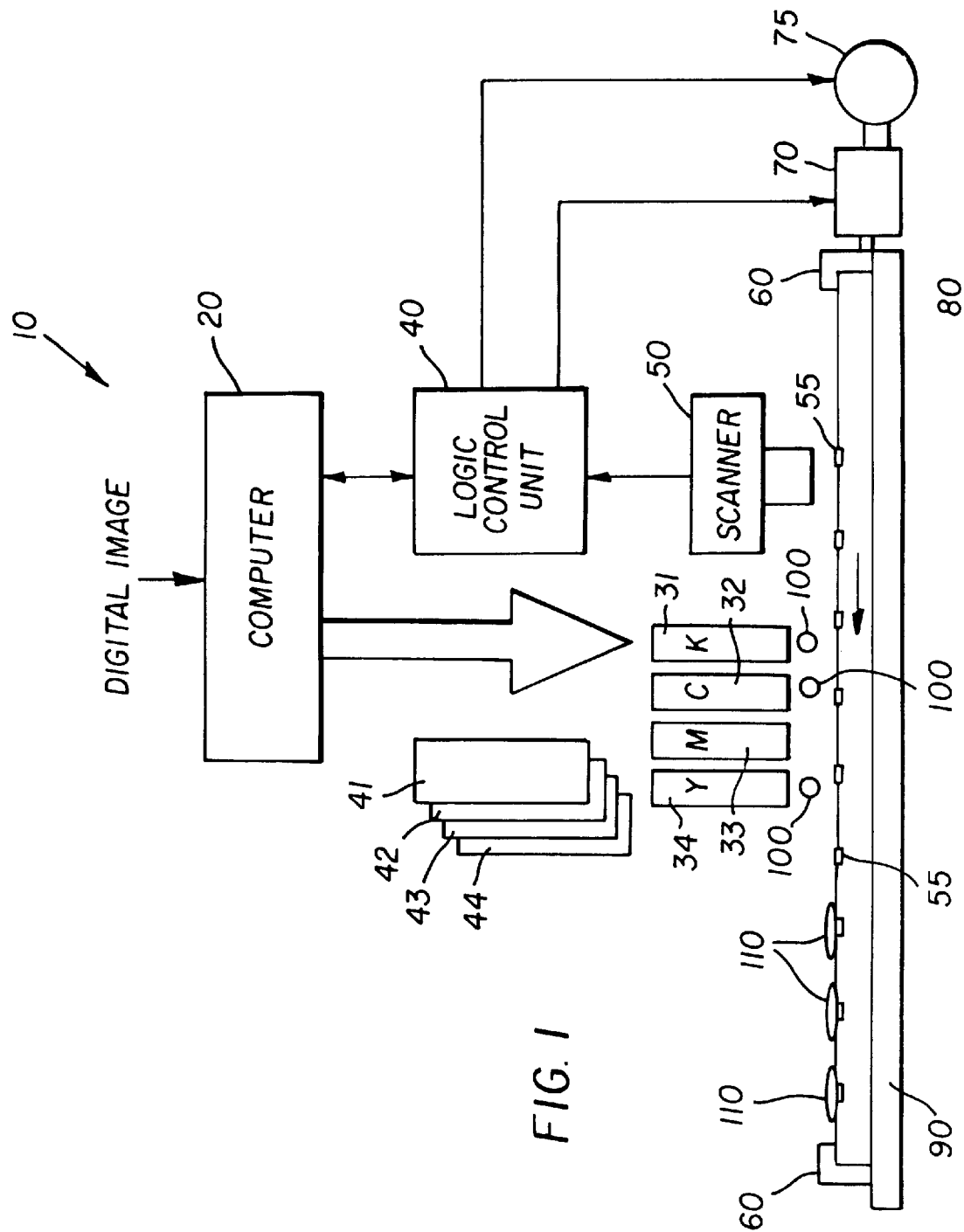
FIG. 1 is a block diagram showing an imaging pixel element transfer apparatus for transferring imaging pixel element onto a substrate for producing a non-emissive display in accordance with the present invention.

Referring to FIG. 1, a block diagram of an imaging pixel element transfer apparatus 10 is shown in accordance with the present invention. The imaging pixel element transfer apparatus 10 includes a computer 20, black, cyan, magenta and yellow print heads 31–34, black, cyan, magenta and yellow fluid reservoirs 41–44, logic control unit 40, scanner 50, electrodes 55, clamps 60, motor 70, motor 75, substrate 80, and platen 90.

The black, cyan, magenta and yellow fluid reservoirs 41–44 each contains fluids having field-driven solid-phase particles respectively for forming black, cyan, magenta and yellow imaging pixels. The fluid can include a dielectric binder and microencapsules which contain the solid-phase field-driven particles. The dielectric binder can include paraffin wax or other low melting resinous material, which melts upon heating and solidifies at the ambient temperatures. The solid-phase field-driven particles can include charged or polarizable reflective particles, dyes and a suitable vehicle. Or alternatively, the microencapsules must contain charged, white, reflective particles in a dyed liquid, or a mixture of two or more different colored particles differing in charge density (white and cyan, for example).

The black, cyan, magenta and yellow print heads 31–34 are respectively in connection with the black, cyan, magenta and yellow fluid reservoirs 41–44, and are each for transferring the droplets 100 to form the image pixel elements 110 of the corresponding color. The print head is an ink jet print head comprising at least one ink nozzle. The fluid can be ejected by either formation of air bubbles caused by heating an electric resistor, or by the actuation of piezoelectric transducers. An ink jet apparatus compatible with the present invention is Tektronix Phaser™ 340 which uses hot-melt ink. Another example of the print head is disclosed in the commonly assigned U.S. Pat. No. 5,598,196.

The substrate 80 is clamped to the platen 90 by clamps 60. The platen 90 and together with the substrate 80 can be transported by motors 70 and 75 in the two directions across the print heads 31–34 so that all pixel locations on the substrate 80 can be moved to the printing position under the print heads 31–34. It is understood that other transport mechanisms well known in the art can be incorporated in the present invention. For example, the print heads 31–34 can be transported by a motor transport system in a lateral direction that is perpendicular to the transport direction of the substrate 80.

The pixel locations on the substrate 80 are defined by the intersection of (row and column) electrodes (details will be discussed later in relation to FIGS. 4a and 4b). In the present invention, the term intersection of electrodes or intersecting electrodes refer to the electrodes that are spaced apart at each pixel for applying an electric field to the solid-phase field-driven particles within the microencapsules. The two electrodes can be constructed in a parallel fashion with the microencapsules sandwiched in between. In this case, the electrode on the viewing side should be made of a transparent conductive material such as tin oxide and copper oxide. The electrodes can also be both fabricated on the non-viewing side of the microencapsules. The conductive materials for the electrodes include aluminum, copper, gold, silver, platinum, brass, or steel alloy.

The transfers of the fluids from the black, cyan, magenta and yellow print heads 31–34 are controlled by the computer 20. The fluid transfer procedure is described as the following. The scanner 50 detects the locations of the electrodes 55 on the substrate 80 and determines the locations of the substrate 80 relative to the print heads 31–34. The scanner 50 sends a signal to the logic control unit 40 about the location of the substrate 80. The logic control unit 40 then controls the motor 70 and/or motor 75 to move the substrate 80 and the platen 90 to the desired printing locations relative to the print heads 31–34 for the next fluid transfer. After the substrate 80 is moved to the correct location relative to the print heads 31–34, the logic control unit 40 sends a signal to the computer 20. The computer 20 subsequently controls the print heads 31–34 to eject droplets 100 to form the correct color imaging pixel elements 110 on the substrate 80. Details about the color pixel patterns and the formation of color pixels will be described in relation to FIGS. 4a and 4b.

Figure 2:
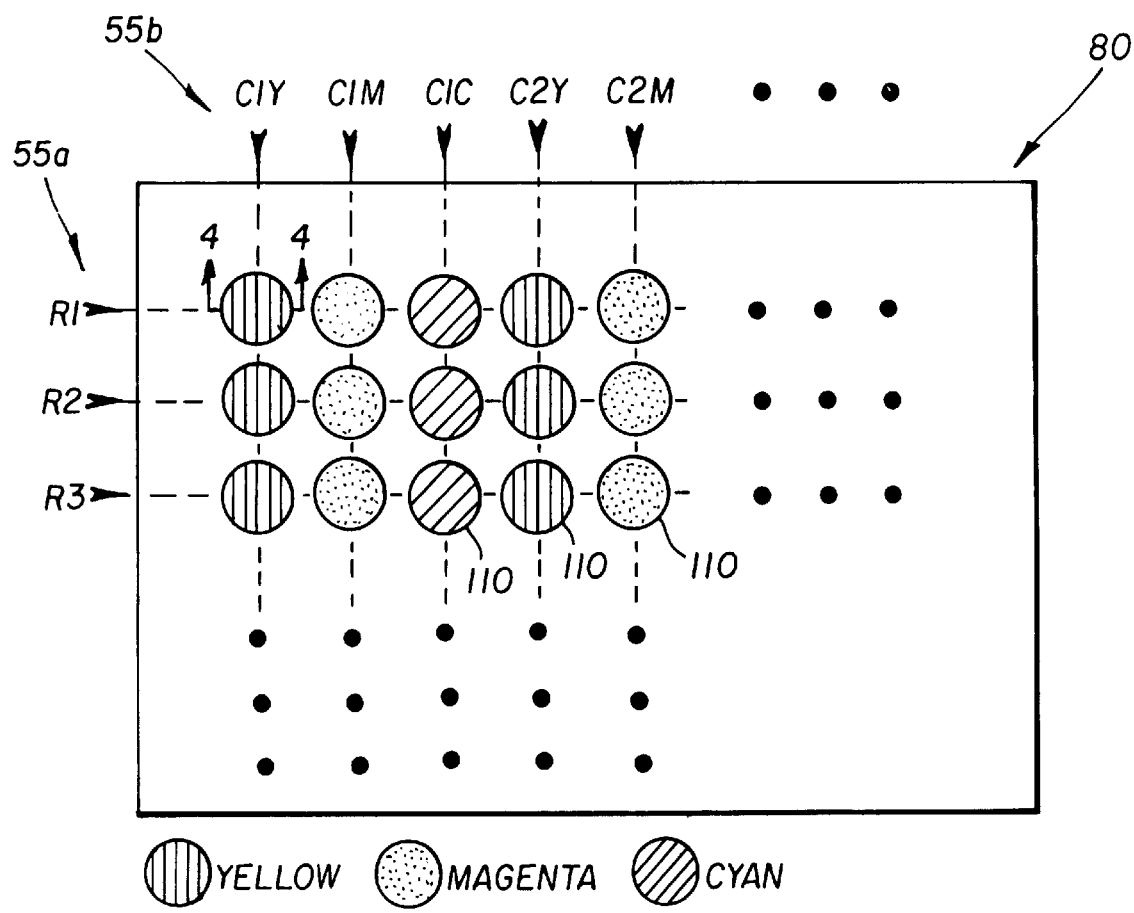
FIG. 2 is a color pattern of the pixels in a non-emissive display in accordance with the present invention.

A layout of a color pattern of imaging pixel elements 110 is shown in FIG. 2 on a substrate 80 for a non-emissive color display. The imaging pixel elements 110 include three different colors: yellow, magenta and cyan. Other colors such as black, red, green, and blue etc. are not shown in FIG. 2, but can also be included. The different color pixels comprise different species of solid-phase field-driven particles each corresponding to the correct color. For example, the yellow imaging pixel elements connected to column electrodes 55 C1Y, C2Y, C3Y . . . comprise solid-phase field-driven particles that are capable of display yellow densities. For the bi-chromatic particles as shown in FIGS. 4a and 4b, the particles are half yellow and half white, aligned along the dipole direction. The color density distribution on the particles are analogous for the magenta imaging pixel elements connected to column electrodes 55 C1M, C2M, C3M . . . and the cyan imaging pixel elements connected to the column electrodes 55 C1C, C2C, C3C . . . Different colors can be formed as by selecting a combination of colored pixels to enable as described in the following table.

TABLE I

The Compositions of Color Pixels

| Color Desired | Yellow Display Pixel 40 | Magenta Display Pixel 40 | Cyan Display Pixel 40 |
| --- | --- | --- | --- |
| White | White | White | White |
| Cyan | White | White | Cyan |
| Magenta | White | Magenta | White |
| Yellow | Yellow | White | White |
| Red | Yellow | Magenta | White |
| Green | Yellow | White | Cyan |
| Blue | White | Magenta | Cyan |

It is understood that the color pattern in Table I represents an example of many possible pixel color patterns that are compatible with the present invention. The area fraction of pixels of each color, the distance between color pixels, and the pixel lattice arrangement can all be optimized for desired color display densities.

The substrate 80 in FIG. 2 also includes row electrodes for addressing the color pixels at each columns C1Y, C1M, C1C, C2Y . . . In FIG. 2, the column and row electrodes are shown as lines, which represent conducting stripes on a non-emissive display. In addition, the intersection of electrodes can include conducting plates for providing the proper electric field to the imaging pixel elements.

Figure 3:
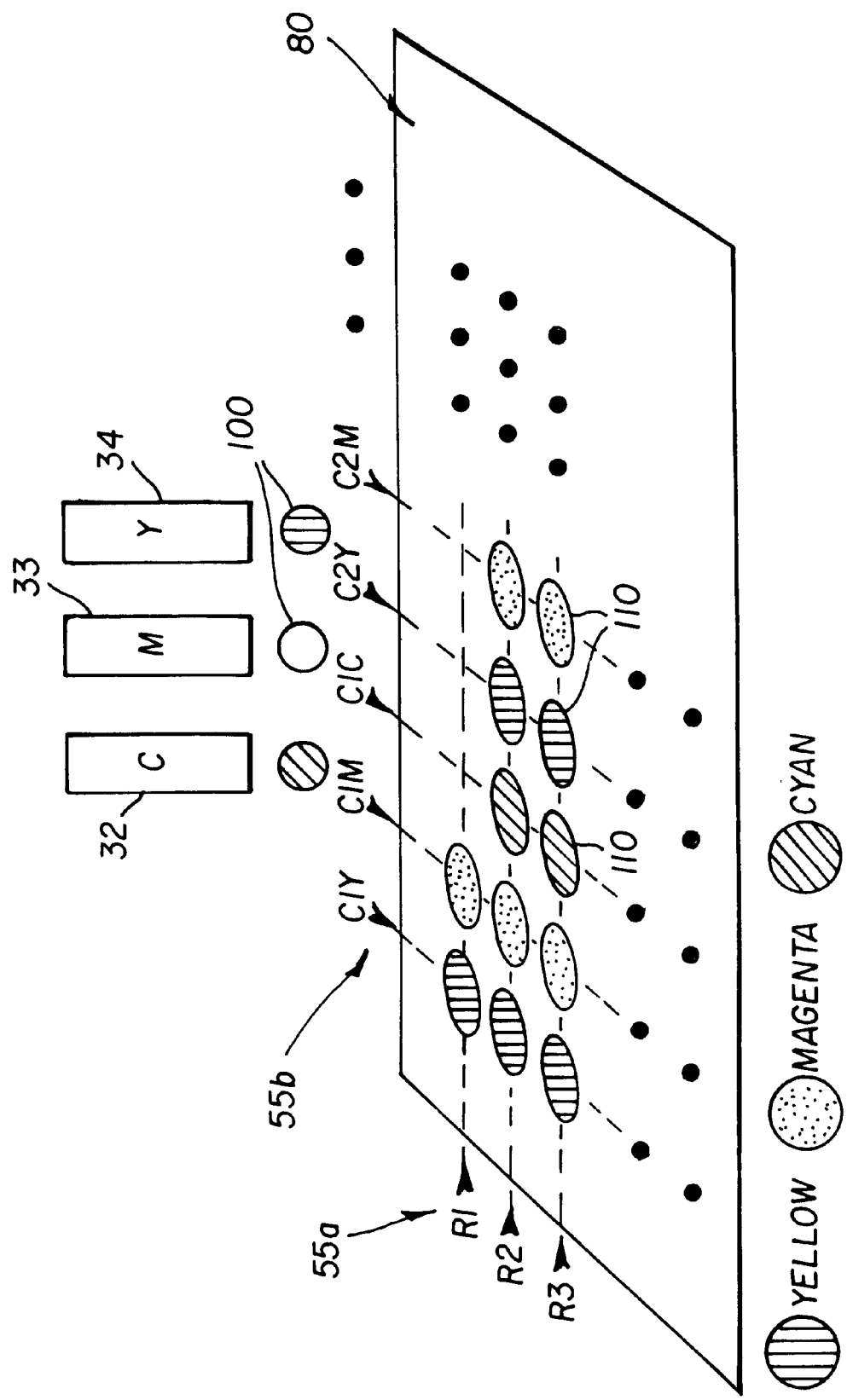
FIG. 3 is a pictorial illustration of the transfer of color imaging elements to the color pattern of the pixels in the non-emissive display as shown in FIGS. 4a and 4b.

FIG. 3 illustrates the transfer of droplets to produce color imaging pixel elements 110 which form the color pixel pattern. For clarity reason, only three colors are shown. The cyan, magenta, and yellow print heads 32–34 each eject fluids comprising solid-phase field-driven particles of respective colors to the corresponding color pixel locations. As discussed previously, the fluids can include a dielectric binder and microencapsules which contain the solid-phase field-driven particles. Upon contact with the substrate, the dielectric binder would wet, adhere and solidify. This would both fix the position of the imaging pixel element and effectively protect the microencapsules. On the substrate 80, the color pixel pattern is shown to be the same as illustrated in FIG. 2.

It is noted that although both row and column electrodes are shown in FIG. 3 for illustrating the color pixel pattern on the substrate 80, the present invention includes the situation in which only a subset of the electrodes are provided on the substrate 80 prior to the placement of the imaging pixel elements 110. For example, the column electrodes can be placed on the substrate 80, the imaging pixel elements are formed, and row electrodes can be placed above the imaging pixel elements, which is illustrated in more detail in FIGS. 4a and 4b.

Figure 4A:
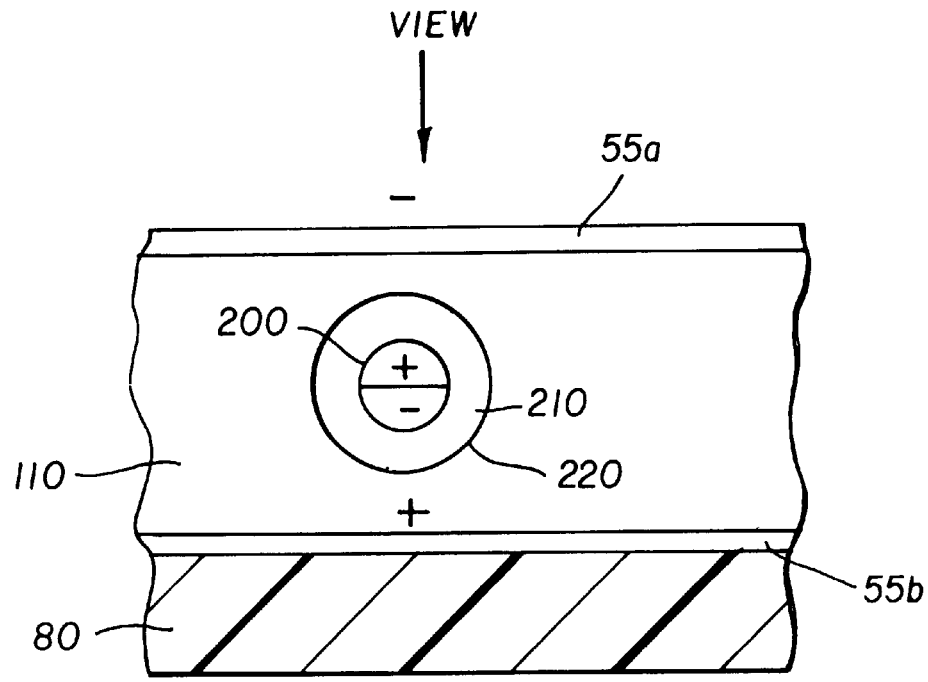
FIGS. 4a and 4b show detailed cross-sectional views of an imaging pixel taken along the lines 4—4 of FIG. 2 which show, in a non-emissive color display, bi-chromatic particles in white and black states, respectively, in accordance with the present invention.
Figure 4B:
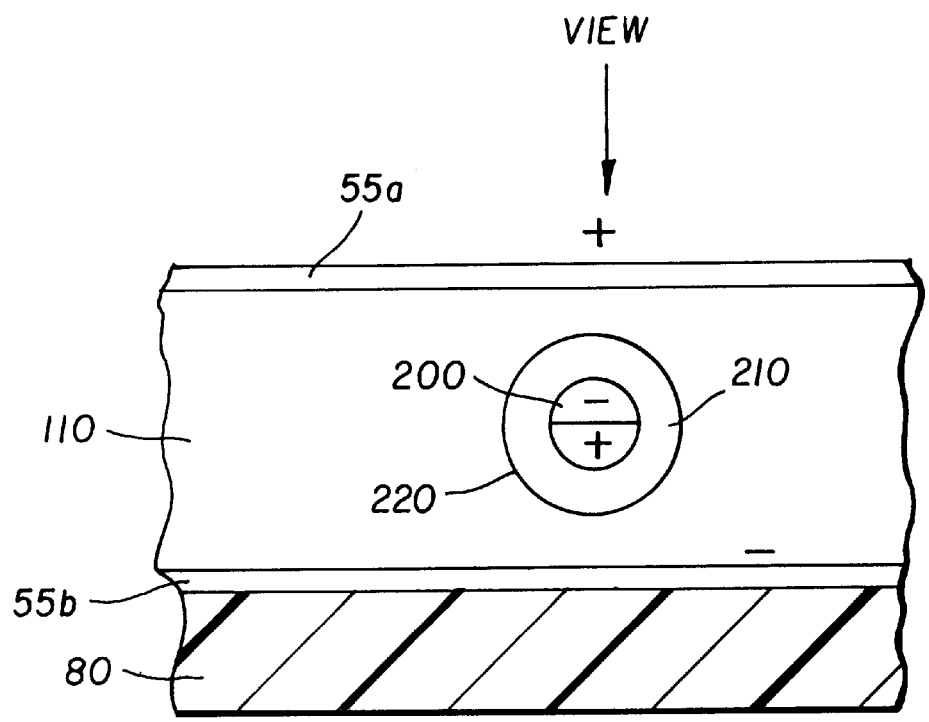

FIGS. 4a and 4b show detailed cross-sectional views of an imaging pixel taken along the lines 4—4 of the non-emissive color display in FIG. 2. The optical density changes at each pixel are produced by applying an electric field at the imaging pixel element 110. The electric field is provided by an electric voltage between the two intersecting electrodes: a row electrode 55a and a column electrode 55b. The column electrode 55b is shown to be provided under the imaging pixel elements 110. The row electrode 55a is above the imaging pixel element 110, which faces the viewing direction. The row electrode is thus required to be made of a transparent conductive material as described above.

In FIGS. 4a and 4b, the field-driven solid phase particles 100 are exemplified by bi-chromatic dipolar particles. Half of the particle is white and the other half is of a different color density such as black, yellow, magenta, cyan, red, green, blue, etc. The bi-chromatic particles are electrically bi-polar. Each of the color surfaces (e.g. white and black) is aligned with one pole of the dipole direction. The term "field-driven solid phase particle" will be understood to include a particle that is in a solid phase. The particles are immersed in an immersing fluid 210 such as oil which are together encapsulated in a microencapsule 220. The microencapsules contain all of the ionic species, thus preventing their direct contact with the electrodes. Without such protection, the performance of the display can be quickly degraded by the contamination of the electrodes.

Upon the application of an electric potential difference between the row electrode 55a and column electrode 55b, bi-chromatic dipolar particles in the microencapsule 220 are aligned to a low energy direction, that is, the ends of the dipole are respectively aligned to the electrodes of the opposite charges.

FIG. 4a shows the solid-phase field-driven particle 200 (bi-chromatic, dipolar) in the white state viewed from the viewing direction with a negative potential applied to the row electrode 55a and a positive potential applied to the column electrode 55b. FIG. 4b shows the solid-phase field-driven particle 200 (bi-chromatic, dipolar) in the black state with a positive potential applied to the row electrode 55a and a negative potential applied to the lower electrode 55b. The state of the solid-phase field-driven particle 200 is dependent on the applied field and not on the prior state of the particle. The non-emissive color display 30 may perform multiple write and erase cycles without effecting performance. The terms write and erase will be understood to be applying a voltage to set the particles to a desired color or a background color respectively. An application may require any color to serve as the background color. Details of the fabrication of the bi-chromatic dipolar particles and their addressing configuration are disclosed in U.S. Pat. Nos. 4,143,103, 5,344, 594, and 5,604,027, and in "A Newly Developed Electrical Twisting Ball Display" by Saitoh et al p249–253, Proceedings of the SID, Vol. 23/4, 1982, the disclosure of these references are incorporated herein by reference.

As discussed previously, the solid-phase field-driven particles in accordance with the present invention can exist in other forms: for example, the electrophoretic particles. Electrophoretic displays are disclosed in U.S. Pat. No. 3,612,758 and PCT Patent Application WO 97/04398, which are herein incorporated.

The invention has been described in detail with particular reference to certain preferred embodiments thereof, but it will be understood that variations and modifications can be effected within the spirit and scope of the invention.

| PARTS LIST | |
|---|---|
| 10 | imaging pixel element transfer apparatus |
| 20 | computer |
| 31 | Black print head |
| 32 | cyan print head |
| 33 | magenta print head |
| 34 | yellow print head |
| 40 | logic control unit |
| 41 | black fluid reservoir |
| 42 | cyan fluid reservoir |
| 43 | magenta fluid reservoir |
| 44 | yellow fluid reservoir |
| 50 | scanner |
| 51 | electrodes |
| 55a | row electrodes |
| 55b | column electrode |
| 60 | clamp |
| 70 | motor |
| 75 | motor |
| 80 | substrate |
| 90 | platen |
| 100 | droplets |
| 110 | imaging pixel element |
| 200 | solid-phase field-driven particle |
| 210 | immersing fluid |
| 220 | microencapsule |

What is claimed is:

1. An ink jet printing apparatus for producing a non-emissive display having a plurality of pixels on a substrate and the pixels being defined by intersecting electrodes, comprising:
    a) a plurality of reservoirs containing fluids including field-driven solid-phase particles;
    b) a print head located in a printing position having at least one nozzle connected to a reservoir;
    c) means responsive to positions of intersecting electrodes and for producing a signal associated with a position of the substrate relative to the print head;
    d) means for moving the substrate in a first direction to the printing position in response to the signal;
    e) means responsive to the signal for causing the print head to eject drops of the fluids from the nozzles at the intersecting electrodes on the substrate and for providing relative movement in a second direction between the print head and the substrate for fluids to be transferred to subsequent intersecting electrodes; and
    f) the field-driven solid-phase particles in the fluid transferred to the substrate being adapted to change optical density in response to an applied electric voltage between the associated intersecting electrodes to produce the desired optical density in the non-emissive display.

2. The ink jet printing apparatus of claim 1 wherein the substrate moving means include a first motor drive arrangement for causing the translation of the substrate in the first direction.

3. The ink jet printing apparatus of claim 2 wherein the signal responsive means include a second motor drive arrangement for causing the translation of the substrate in the second direction.

4. The ink jet printing apparatus of claim 1 further including substrate holding means for holding the substrate relative to the substrate moving means for accurate translation of the substrate relative to the print head.

5. The ink jet printing apparatus of claim 1 wherein the print head includes an electromechanical transducer for causing the ejection of the imaging material.

6. The ink jet printing apparatus of claim 5 wherein the electromechanical transducer includes piezoelectric material.

7. The ink jet printing apparatus of claim 1 wherein the print head includes a heat generating element for ejecting the ink droplets from said nozzles.

8. The ink jet printing apparatus of claim 1 wherein the field-driven solid-phase particles include bi-chromatic bi-polar particles.

9. The ink jet printing apparatus of claim 1 wherein the field-driven solid-phase particles include electrophoretic particles.

10. The ink jet printing apparatus of claim 1 wherein the field-driven solid-phase particles are contained in microencapsules.

11. An irk jet printing apparatus for producing a non-emissive color display having a plurality of pixels on a substrate and the pixels being defined by intersecting electrodes, comprising:

a) a plurality of reservoirs containing fluids including field-driven solid-phase particles capable of displaying at least two different colors;

b) a plurality of print heads located in printing position having nozzles connected to the reservoir;

c) means responsive to positions of intersecting electrodes and for producing a signal associated with a position of the substrate relative to the print head;

c) means for moving the substrate in a first direction to the printing position in response to the signal;

e) means responsive to the signal for causing the print head to eject drops of the fluids including solid-phase field-driven particles for displaying different color densities from the nozzles to the intersecting electrodes corresponding to the correct colors on the substrate, and for providing relative movement in a second direction between the print head and the substrate for the fluids to be transferred to subsequent intersecting electrodes; and f) the field-driven solid-phase particles in the fluid transferred to the substrate being adapted to change optical density in response to an applied electric voltage between the associated intersecting electrodes to produce the desired color optical density in the non-emissive display.

12. The ink printing apparatus of claim 11 wherein the substrate includes a mosaic pattern of color pixels for forming a color image on the display.

13. A method for producing a non-emissive display having a plurality of pixels on a substrate and the pixels being defined by intersecting electrodes, comprising:

a) providing a plurality of reservoirs containing fluids including field-driven solid-phase particles;

b) providing a print head located in a printing position having at least one nozzle connected to a reservoir;

c) positioning the intersecting electrodes and for producing a signal associated with the position of the substrate relative to the print head;

c) moving the substrate in a first direction to the printing position in response to the signal;

e) ejecting drops of fluids from the reservoirs in response to the signal onto the intersecting electrodes on the substrate;

f) providing relative movement in a second direction between the print head and the substrate for fluids to be transferred to subsequent intersecting electrodes; and g) providing the field-driven solid-phase particles in the fluid transferred to the substrate which change optical density in response to an applied electric voltage between the associated intersecting electrodes to produce the desired optical density in the non-emissive display.

* * * * *